United States Patent [19]
Vali et al.

[11] Patent Number: 5,164,608
[45] Date of Patent: Nov. 17, 1992

[54] PLURAL WAVELENGTH FIBER OPTIC LIQUID LEVEL SENSOR FOR MULTIPLE LIQUIDS

[75] Inventors: Victor Vali, Laguna Hills; David B. Chang, Tustin, both of Calif.

[73] Assignee: Hughes Aircraft Company, Los Angeles, Calif.

[21] Appl. No.: 722,587

[22] Filed: Jun. 27, 1991

[51] Int. Cl.⁵ .............................................. G01N 15/06
[52] U.S. Cl. ............................... 250/577; 250/227.23; 250/227.25
[58] Field of Search ................ 250/227.21, 227.23, 250/227.25, 577, 226; 385/12

[56] References Cited

U.S. PATENT DOCUMENTS

| | | | |
|---|---|---|---|
| 4,045,668 | 8/1977 | Pitt et al. ....................... | 250/227.25 |
| 4,287,427 | 9/1981 | Scifres ............................ | 250/577 |
| 4,544,840 | 10/1985 | Keller ............................ | 250/227.25 |
| 4,644,177 | 2/1987 | Barabino ........................ | 385/12 |
| 4,851,665 | 7/1989 | Pesavento et al. ............ | 250/227.23 |
| 5,077,482 | 12/1991 | Vali et al. ..................... | 250/577 |

Primary Examiner—David C. Nelms
Assistant Examiner—K. Shami
Attorney, Agent, or Firm—Michael W. Sales; Wanda K. Denson-Low

[57] ABSTRACT

A fiber optic liquid level sensor for measuring the level of multiple immiscible liquids in a container (20). An end of an optical fiber (24) is immersed in the liquids in the container (20). Light is injected into the other end of the fiber. The ratio of transmitted to the reflected light is dependent on the evanescent mode losses to the liquids in the container. The levels of the liquids are derived from the losses, since the absorption per unit length of the fiber is different for each liquid. The relative amounts of liquids in the container are obtained from the amount of absorption.

10 Claims, 2 Drawing Sheets

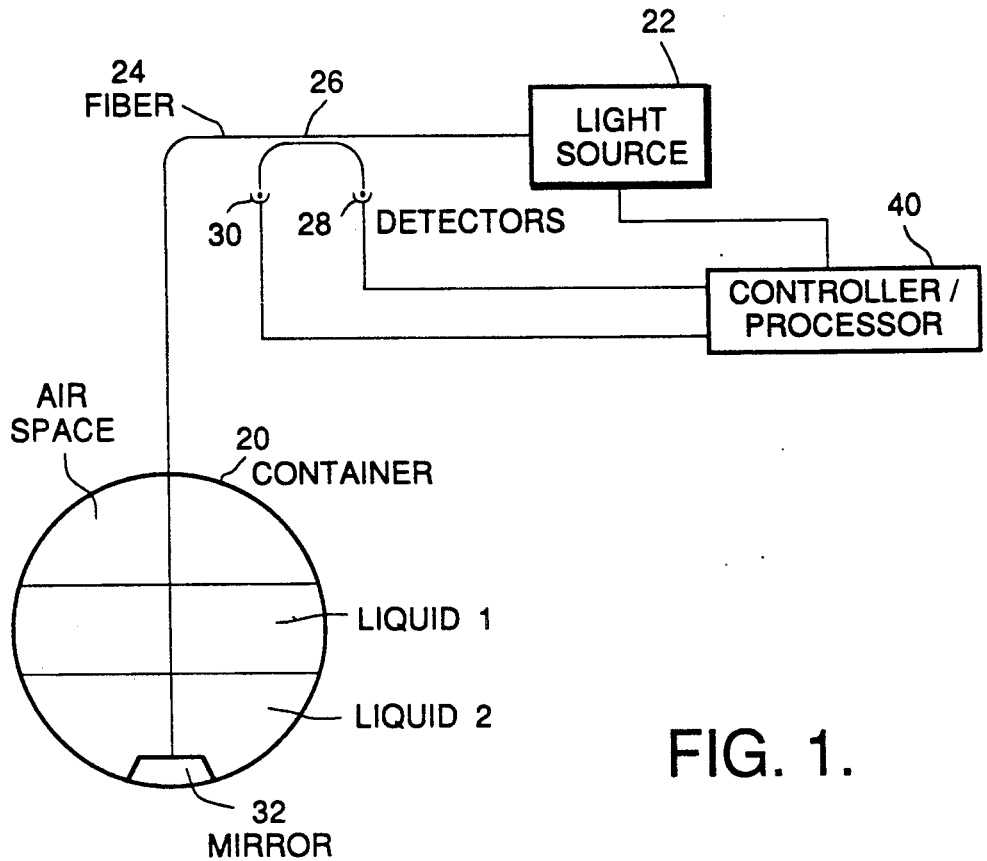
FIG. 1.
FIG. 2.
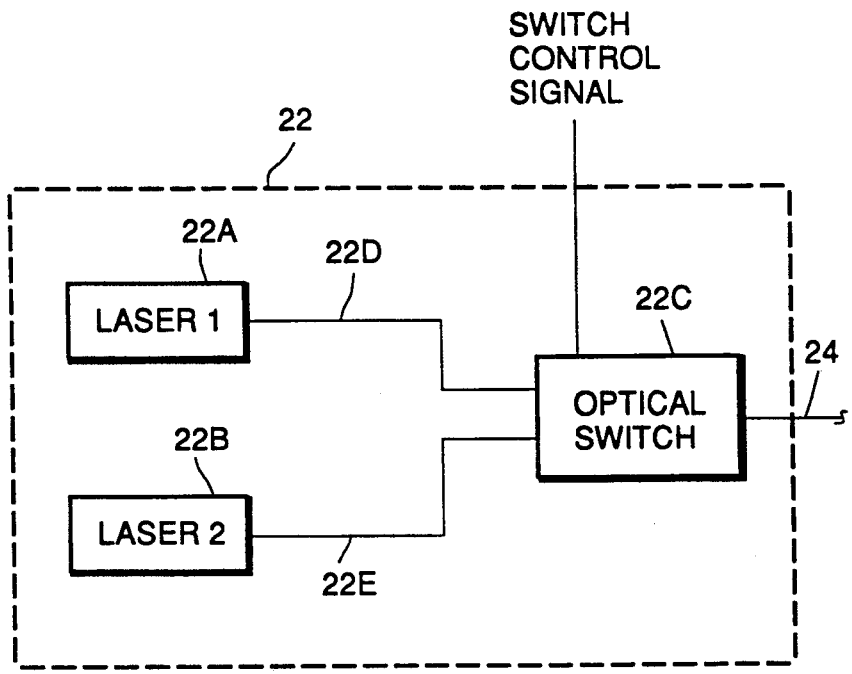

PLURAL WAVELENGTH FIBER OPTIC LIQUID LEVEL SENSOR FOR MULTIPLE LIQUIDS

BACKGROUND OF THE INVENTION

The present invention relates to measuring the amounts of immiscible liquids in storage tanks.

For determining the kinds (and amounts) of different liquids in a storage tank, a sampling technique has typically been used. Some liquids are drawn off at different levels in the tank and analyzed. However, this is a manual, time-consuming procedure.

There is a need for an apparatus to determine the thickness of different layers of immiscible layers of liquid in a tank to facilitate withdrawal of selected liquids. A reliable, low cost, chemical sensor to determine the amounts of different liquids in a storage tank would be useful in various applications, including environmental applications.

SUMMARY OF THE INVENTION

In accordance with this invention, a system is provided for measuring the thickness of layers of immiscible layers of different liquids in a container. The system includes a light source for generating light at respective wavelength bands at which the respective liquids are highly absorptive. The light from the light source is injected into one end of an optical fiber which includes a sensing length of fiber extending into the container and through said layers of liquids. The sensing length of fiber is characterized in that it comprises a core clad by a cladding layer of a material and thickness selected to provide significant evanescent wave loss of the absorptive wavelength band light when immersed in the respective liquid which is highly absorptive at this wavelength band.

The system further includes means for determining the light loss from the sensing fiber due to evanescent wave loss, and for processing the light loss data for each band of light to determine the thickness level of each respective liquid in said container.

BRIEF DESCRIPTION OF THE DRAWING

These and other features and advantages of the present invention will become more apparent from the following detailed description of an exemplary embodiment thereof, as illustrated in the accompanying drawings, in which:

FIG. 1 illustrates a simplified schematic diagram of a liquid level sensor for multiple liquids in accordance with the present invention.

FIG. 2 is a simplified block diagram of a light source usable in the system of FIG. 1.

DETAILED DESCRIPTION OF THE PREFERRED EMBODIMENT

Figure 3:
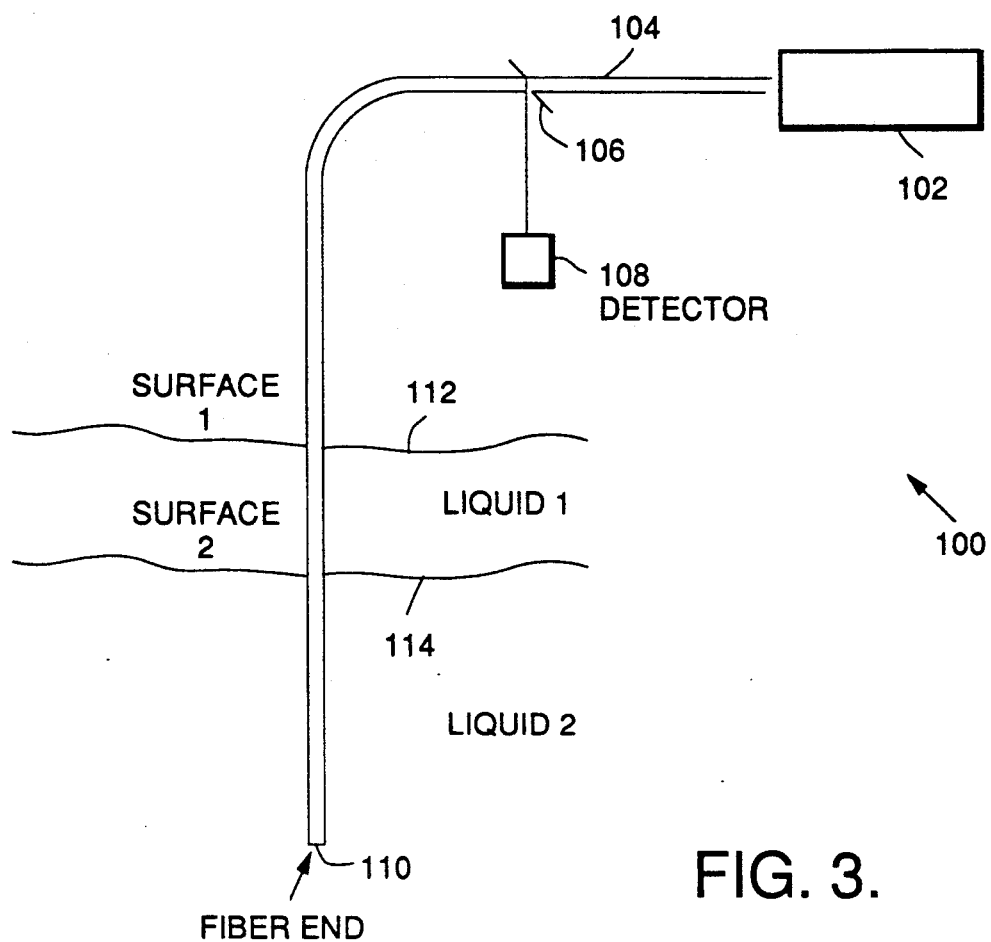
FIG. 3 illustrates a liquid level sensor according to one embodiment of the invention.

The invention is an application of the evanescent wave absorption technique for measuring the length of a fiber immersed in a liquid. This technique is described in the co-pending application Ser. No. 07/484,295, filed Feb. 23, 1990, entitled "Fiber Optic Fuel and Liquid Gauge," by V. Vali et al., now U.S. Pat. No. 5,077,482, the entire contents of which are incorporated herein by this reference. When the cladding thickness of an optical fiber is only a few wavelengths of light, as in an eccentric core fiber, the evanescent wave extends outside the fiber cladding. If such a fiber is covered by or immersed in a liquid with index of refraction larger than that of the fiber cladding, some of the light leaks out of the fiber core. This effect can be used to determine the height of the liquid level in a container, as described in the referenced co-pending application.

FIG. 1 illustrates a liquid level analyzer system in accordance with this invention. In this example, a storage tank 20 is shown in cross-section, and contains two immiscible liquids (such as, by way of example, gasoline and water). The liquid level analyzer comprises a light source 22, an optical fiber 24 which extends between the light source 22 and the tank 20, a fiber beam splitter 26 and first and second photodetectors 28 and 30. A mirror 32 is placed at the container end of the fiber 24 to reflect the incident light. Photodetector 28 provides an indication of the input light intensity, and photodetector 30 provides an indication of the intensity of the return light. A controller/processor 40 controls the light source 22 and processes the first and second detector signals from the detectors 28 and 30 to determine the respective liquid levels.

The system of FIG. 1 exploits the fact that different liquids have different spectral absorption characteristics, in that the absorptivity is a function of wavelength. The wavelength at which absorption is a maximum depends on the molecules which are absorbing the light energy. The absorption will be at a relative maximum at the natural resonance frequencies of the molecules (due to vibrations or rotations). The absorption spectral characteristic will typically have many peaks over a wide wavelength band, and will be highly absorptive at one or more wavelength bands, many of them found in the infrared region. These absorption lines are due to material resonances. The lowest frequency resonances are due to molecule rotation, and typically occur around $10^{13}$ cycles/second. The middle frequency resonances are due to vibrations, and typically occur around $10^{14}$ cycles/second. The highest frequency resonances are due to electronic transitions, and occur around $10^{15}-10^{16}$ cycles/second.

The absorption per unit length of the fiber 24 is chosen such that, for the maximum length of the fiber in a particular liquid, at most about 90% of the light is absorbed in a particular absorption band. For each kind of liquid, a particular wavelength of light is chosen corresponding to a particular absorption band characteristic of the particular liquid. The relative amounts of liquids in the storage tank are then obtained from the amount of absorption for the particular wavelength of light then being utilized. In the case of measuring gasoline and water, gasoline exhibits strong absorption of light in the 1.1 to 1.2 micron range, while water exhibits strong absorption at 2, 2.7 and 4 microns.

FIG. 2 illustrates an exemplary light source 22 usable for the system of FIG. 1. This source is for the application in which the system is to measure the level of two different liquids. Two lasers, e.g., semiconductor laser devices 22A and 22B, provide light at wavelengths at which the respective two liquids are absorptive. Other types of light sources may alternatively be used. For example, a broadband light source may be employed, with appropriate filters so that only light at the absorption wavelength band is injected into the optical fiber. The light from the respective lasers 22A and 22B is conducted to an optical switch 22C via respective optical fibers 22D and 22E. The optical switch 22C is operated to select the light from a particular laser and output the selected light to the optical fiber 24 of the system of FIG. 1. The switch 22C is controlled by a control signal from the controller 40 of FIG. 1 to select the desired laser 22A or 22B.

Optical switches suitable for the purpose of switch 22C are well known in the art of integrated optics, see, e.g., D. Y Zang, and C. S. Tsai, "Titanium-undiffused proton-exchanged waveguide lens in LiNb0$_3$ for optical information processing," Applied Optics, Vol. 25, No. 14, p. 2264, 15 July 1986; P. Tien and J. A. Giordmaine, "Building the Integrated Optical Circuit," Optical Spectra, p. 54, June 1981.

In case of overlapping absorption bands, a wide band light source (like an LED or semiconductor laser diode) can be used with an optical time domain reflectometer technique (OTDR) to obtain time resolved spectra. The accuracy of such a technique can be in the submillimeter range (the accuracy of the OTDR).

FIG. 3 illustrates an exemplary liquid level sensor 100 employing the OTDR technique. Here, a pulsed wideband semiconductor laser 102 injects a very short pulse of light into one end of the optical fiber 104 which extends into the container in which the multiple immiscible liquids are stored. To obtain measurement resolution of 3 cm in an application wherein the speed of light is $3 \times 10^{10}$ cm/second requires a pulse length no greater than $10^{-10}$ seconds. Line 112 indicates the upper surface of the first liquid, and line 114 indicates the upper surface of the second liquid. The fiber 104 extends into the container through the surfaces of the liquids. An optical fiber beamsplitter 106 splits off the backscattered light returned from the second end 110 of the fiber 104 to a photodetector 108.

Figure 4:
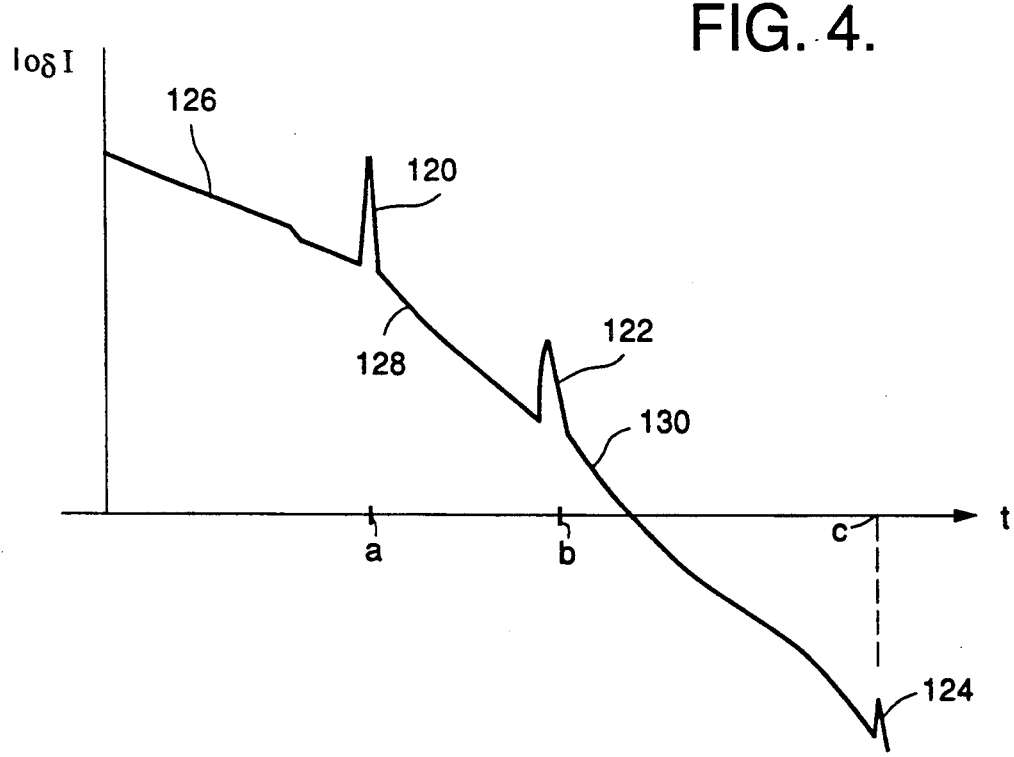
FIG. 4 illustrates an exemplary plot of the logarithm of the return light signal as a function of time.

The sensor 100 operates in the following manner. A pulse of laser light injected into the fiber 104 will reflect off each surface, and will be absorbed as well, to varying degrees depending on the absorptivity characteristics of each liquid. FIG. 4 illustrates an exemplary plot of the logarithm of the return light signal intensity picked up by the detector 108 as a function of time. Several discontinuity spikes 120, 122 and 124 are seen in the intensity curve, at time points a, b and c which are at twice the time it takes the light to propagate from the detector to the surface 112, i.e. at time a, to the surface 114 at time b, and to the end of the fiber at time c. Moreover, the slope of the intensity curve will depend on the particular loss coefficient of the liquid. Thus, the slope K1 of the intensity curve portion 126, extending from t=0 to t=a, is determined by the absorptivity characteristic of the fiber in air. The slope K2 of the intensity curve portion 128, extending between t=a to t=b, is determined by the absorptivity characteristic of the first liquid. The slope K3 of the curve between time t=b and t=c is determined by the absorptivity characteristic of the second liquid liquid. The depth of the first and second liquids can be determined by relating the respective times a and b to the speed of light in the fiber to determine the propagation distance, which is twice the distance to the particular surface, since both the propagation times to and from the particular surface must be considered. The particular liquids in the container can be determined by relating the particular slopes of the intensity curve to predetermined slopes associated with particular liquids.

Alternatively, in the case of overlapping absorption bands, measurements can be obtained at multiple wavelengths, and simultaneous equations relating the intensity to the absorption at the respective wavelengths can be solved using the differences in the absorption coefficients.

It is understood that the above-described embodiments are merely illustrative of the possible specific embodiments which may represent principles of the present invention. Other arrangements may readily be devised in accordance with these principles by those skilled in the art without departing from the scope and spirit of the invention.

What is claimed is:

1. A system for measuring the thickness of layers of immiscible layers of different liquids in a container, comprising:

a light source for generating light at respective wavelength bands at which the respective liquids are highly absorptive;

an optical fiber having one end into which the light from said light source is injected, and a sensing length of fiber extending into said container and through said layers of liquids, said sensing length of fiber characterized in that it comprises a core clad by a cladding layer of a material and thickness selected to provide significant evanescent wave loss of said absorptive wavelength band light when immersed in said respective liquid which is highly absorptive at said wavelength band and;

means for determining the light loss from the sensing fiber due to evanescent wave loss and processing said light loss to determine the thickness level of each respective liquid in said container.

2. The system of claim 1 wherein said respective wavelength bands at which one of said liquids is highly absorptive does not overlap with the wavelength bands at which the other said liquids are highly absorptive.

3. The system of claim 1 wherein said sensing length of fiber is characterized by an eccentric core, and said cladding material is characterized by an index of refraction which is less than that of the respective liquids.

4. The system of claim 1 wherein said means for determining the light loss from said fiber comprises a fiber beamsplitter for splitting a portion of the input light to a first photodetector for indicating the intensity of the input light injected into the first end of the fiber, and for splitting a portion of the return light to a second photodetector for indicating the intensity of the return light.

5. The system of claim 1 wherein said light source comprises a plurality of laser sources, one for each of said different liquids, each said laser source for generating light at a corresponding absorptive wavelength band, and means for selectively injecting the light from a selected one of said laser sources into said optical fiber to measure the level of the liquid which is highly absorptive to said wavelength band of said selected laser source.

6. The system of claim 1 wherein one of said liquids is gasoline, and another of said liquids is water.

7. The system of claim 1 wherein the optical fiber is constructed so that the maximum evanescent wave light loss for a maximum amount of a particular liquid in said container is about 90%.

8. The system of claim 1 wherein said respective liquids are characterized by respective absorption bands which are overlapping, and said light source is a wideband source for generating very short pulses of light, and wherein said determining means comprises means for obtaining time resolved spectra of said light loss, and wherein said processing means comprises means for relating the relative times at which discontinuities in said light loss appear to the height of the liquids in said container.

9. A method for measuring the thickness of immiscible layers of different liquids in a container, characterized by a sequence of the following steps:

disposing a sensing length of an optical fiber into the liquid container so that it extends through said layers of liquids, said sensing length of fiber characterized in that it comprises a core clad by a cladding layer of a material and thickness selected to provide significant evanescent wave loss when immersed in a particular one of said liquids at a wavelength band at which the respective liquid is highly absorptive;

injecting light at said respective absorptive wavelength bands into one end of said optical fiber; and determining the light loss from the sensing fiber due to evanescent wave loss and processing said light loss to determine the thickness level of each respective liquid in said container.

10. The method of claim 9 wherein said respective liquids are characterized in that said respective wavelength band at which one of said liquids is highly absorptive does not overlap with the wavelength bands at which the other said liquids are highly absorptive.

* * * * *